Figures 1, 2:
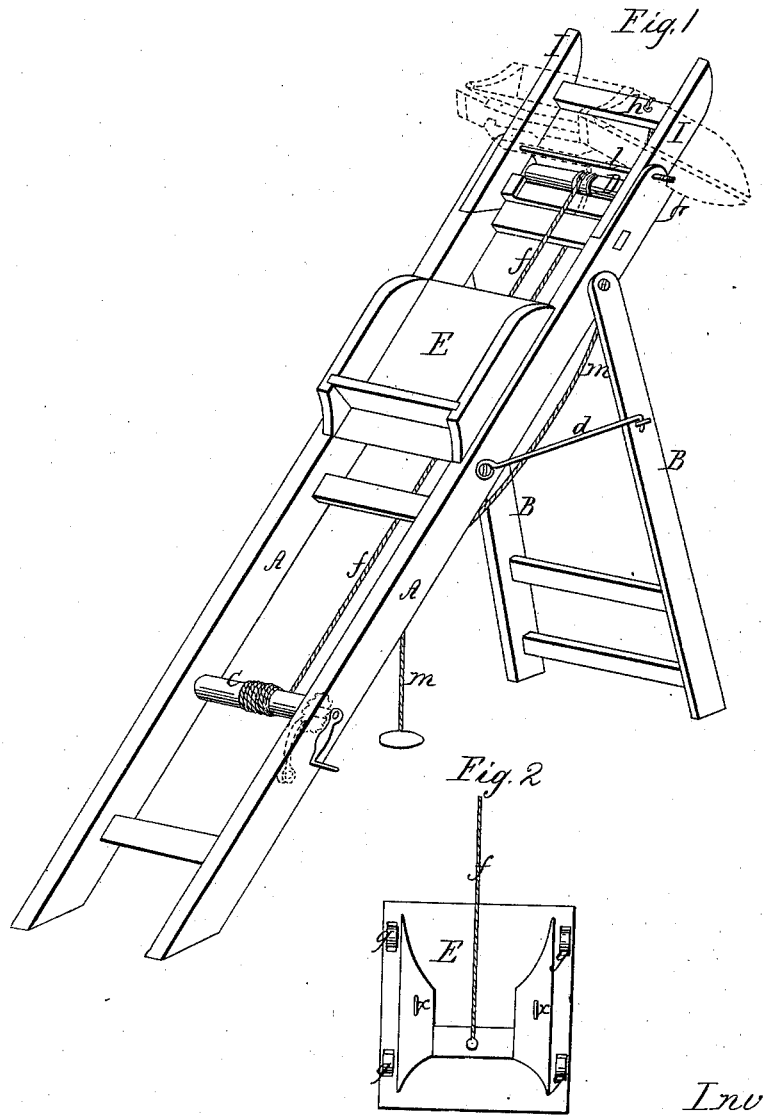

J. Sanderson,
Elevator.

No. 78,138. Patented May. 19, 1868.

Witnesses
Wm Vandebon
Cornelius Coe

Inventor
J. Sanderson
per Alexander & Mason
attys

United States Patent Office.

JAMES SANDERSON, OF FREDERICKSBURG, OHIO.

Letters Patent No. 78,138, dated May 19, 1868.

IMPROVED HOISTING-APPARATUS.

*The Schedule referred to in these Letters Patent and making part of the same.*

TO ALL WHOM IT MAY CONCERN:

Be it known that I, JAMES SANDERSON, of Fredericksburg, in the county of Wayne, and in the State of Ohio, have invented certain new and useful Improvements in Hoisting-Apparatus; and do hereby declare that the following is a full, clear, and exact description thereof, reference being had to the accompanying drawings, and the letters of reference marked thereon.

In the annexed drawings, making a part of this specification, A A represent the sides of a frame or ways, held together by means of suitable cross-bars, for my improved hoisting or elevating-machine.

Pivoted to the ways A A are arms or legs B B, as shown. Said legs B B are held in place so as to support the ways A A by means of hooks d d, which catch in staples in the sides of said legs. When this machine is not in use the hooks d d are detached and the legs folded up against the ways A A, so as to occupy but small space and be easily handled.

C and D represent rollers forming a windlass, having their bearings in and working between the ways A A.

The roller or cylinder C is provided with a suitable crank, by which it is operated, and the roller D is provided with a pulley or groove around its centre for the cord $f$ to pass and work over.

The ways A A are adjusted at any desired angle, and made of any required length.

Pivoted between and at the top of the ways A A is another tilting-frame, I, made just as wide between its sides as the ways A A, so that the car E will run up on it as a uniform track with said ways A A.

The frame I is pivoted by means of a rod, $l$, extending across the top and through the ways and frame, as shown in the drawings.

A cord or rope, $m$, is secured to a cross-bar, $h$, of the frame I, and passes down through a loop near the crank of the roller, C, so that the operator may tilt the said frame I whenever the same may be required.

E represents a car, of suitable size and construction, to carry stone, earth, brick, or mortar, and has adjusted on the bottom of it small rollers or wheels $g\ g$, to run up on the ways A A and the frame I.

Small hooks $x\ x$ are driven into the bottom of the car E, which catch around the rod $l$, and stop said car when the operator pulls on the cord $m$, and tilts the frame I and car E thereon, so as to throw the load on to a scaffold, wagon, or the side of a bank, as may be desired.

One end of the cord $f$ is secured to the car E, and passes up over the roller D, and thence down to the winding-cylinder C, to which the other end is secured.

The operator, by turning the crank, winds up the cord, and thereby draws the car E up the ways A A on to the tilting-frame I, where it is dumped, as above described.

On and across the under side of the ways A A is secured a strong cross-bar, $r$, to hold the frame I from tilting over too far.

This device is designed for elevating building-materials to the scaffold, earth out of a deep cut, or stone and gravel to a wagon or railroad-car.

Having thus fully described my invention, what I claim as new, and desire to secure by Letters Patent, is—

The arrangement of the ways A A, tilting-frame I, car E, with its rollers $g\ g$, hooks $x\ x$, windlass C D, and cord $m$, the whole combined and operated as specified.

In testimony that I claim the foregoing, I have hereunto set my hand, this 3d day of March, 1868.

JAMES SANDERSON.

Witnesses:
S. M. APPLEMAN,
W. S. PEPPARD.